United States Patent [19]

Choe et al.

[11] Patent Number: 4,485,232
[45] Date of Patent: Nov. 27, 1984

[54] TWO STAGE MELT PRODUCTION OF HIGH MOLECULAR WEIGHT POLYBENZIMIDAZOLES WITH PHOSPHOROUS CATALYST

[75] Inventors: Eui W. Choe, Randolph; Anthony B. Conciatori, Chatham, both of N.J.

[73] Assignee: Celanese Corporation, New York, N.Y.

[21] Appl. No.: 543,052

[22] Filed: Oct. 18, 1983

Related U.S. Application Data

[62] Division of Ser. No. 461,888, Jan. 28, 1983, Pat. No. 4,452,972.

[51] Int. Cl.$^3$ .............................................. C08G 73/18
[52] U.S. Cl. ................................... 528/207; 528/206; 528/208; 528/313; 528/331
[58] Field of Search ............... 528/313, 207, 206, 208, 528/331

[56] References Cited

U.S. PATENT DOCUMENTS 4,312,976  1/1982  Choe .................................. 528/313

Primary Examiner—Harold D. Anderson
Attorney, Agent, or Firm—Depaoli & O'Brien

[57] ABSTRACT

This invention provides a two stage melt polymerization process for the production of an improved type of high molecular weight polybenzimidazole, which involves the use of an arylphosphinic acid or arylphosphonic acid polymerization catalyst.

The process provides poly-2,2'-(m-phenylene)-5,5'-bibenzimidazole of improved color and plugging value, and is further characterized by an inherent viscosity of at least about 0.7 dl/g, and a weight average molecular weight of at least about 100,000.

2 Claims, No Drawings

TWO STAGE MELT PRODUCTION OF HIGH MOLECULAR WEIGHT POLYBENZIMIDAZOLES WITH PHOSPHOROUS CATALYST

This is a division of application Ser. No. 461,888, filed Jan. 28, 1983, now U.S. Pat. No. 4,452,972.

BACKGROUND OF THE INVENTION

Typical processes for preparing polybenzimidazoles are described in Journal of Polymer Science, 50, 511 (1961), and in various U.S. patents.

U.S. Pat. No. 3,174,947 (U.S. Pat. No. Re. 26,065) describes a method of preparing high molecular weight aromatic polybenzimidazoles by melt polymerizing an aromatic tetraamine and a diphenyl ester or an anhydride of an aromatic dicarboxylic acid at an elevated temperature and thereafter further polymerizing the product of the melt polymerization in the solid state. According to this process, in order to produce polymers of sufficiently high molecular weight to be suitable for practical use it is necessary to finely pulverize the product of the melt polymerization prior to polymerization in the solid state and to conduct the solid state polymerization at an elevated temperature under a reduced pressure of less than 0.5 mm Hg or at an elevated temperature and in an inert gas stream over a prolonged period of time. Thus, the process requires several complicated operations. In addition, since the reaction is conducted over a long period of time at an elevated temperature, it tends to form insoluble and infusible polymers.

U.S. Pat. No. 3,313,783 describes a process adapted to overcome the above-mentioned deficiencies which process involves the solution polymerization of an inorganic acid salt of an aromatic tetraamine and a dicarboxylic acid or a derivative thereof with heat in polyphosphoric acid. After completion of the reaction the polymer product is separated by pouring the reaction mixture in the form of a polyphosphoric acid solution into a large quantity of water. However, this separation procedure is complicated and it is difficult to recover and reuse the polyphosphoric acid.

Another process for producing polybenzimidazoles is described in U.S. Pat. No. 3,509,108. In the process the monomers are initially reacted in a melt phase polymerization at a temperature above 200° C. and a pressure above 50 psi. The reaction product is then heated in a solid state polymerization at a temperature above 300° C. to yield the final aromatic polybenzimidazole product. The process requires that the initial reaction be conducted at a pressure above 50 psi (preferably, between 300-600 psi) in order to control the foaming encountered during the polymerization.

U.S. Pat. No. 3,555,389 describes a two stage process for the production of aromatic polybenzimidazoles. The monomers are heated at a temperature above 170° C. in a first stage melt polymerization zone until a foamed prepolymer is formed. The foamed prepolymer is cooled, pulverized, and introduced into a second stage polymerization zone where it is heated in the presence of phenol to yield a polybenzimidazole polymer product. As with the process of U.S. Pat. No. Re. 26,065, this process involves multiple operations and tends to form insoluble polymers.

U.S. Pat. No. 3,433,772 describes a two stage polymerization process for the production of aromatic polybenzimidazoles which utilize an organic additive, such as an alkane having 11-18 carbon atoms or a polycarbocyclic hydrocarbon, in order to control foaming during the first stage.

Other U.S. patents relating to one stage and two stage production of polybenzimidazoles include U.S. Pat. Nos. 3,408,336; 3,549,603; 3,708,439; 4,154,919; and 4,312,976; all patents enumerated herein incorporated by reference.

Technical Report AFML-TR-73-22 (Air Force Material Laboratory, Wright-Patterson AFB, Ohio) describes the production of polybenzimidazole from tetraaminobiphenyl and diphenyl isophthalate in the presence of various catalysts such as ammonium chloride, hydrochloric acid, p-toluenesulfonic acid, phosphoric acid, triphenylphosphate and boron trifluorideetherate.

In the Technical Report (pages 26-27) the data indicate that phosphorus-containing catalysts such as phosphoric acid and triphenyl phosphate are effective for increasing the inherent viscosity of a polybenzimidazole resin. However, there is formation of gel and insoluble black specks which tend to affect adversely the Plugging Value property of the polybenzimidazole products.

There remains a need for an improved method of producing polybenzimidazole which overcomes the various disadvantages of the prior art procedures, and which method yields an improved type of polybenzimidazole product particularly suitable for the formation of fibers having a high melting point and a high degree of thermal stability.

Accordingly, it is an object of the present invention to provide an improved two stage polymerization process for the production of high molecular weight polybenzimidazole in the presence of a phosphorus-containing catalyst.

It is another object of this invention to provide a high molecular weight polybenzimidazole which is characterized by an improved plugging value and an improved color specification.

Other objects and advantages of the present invention shall become apparent from the accompanying description and examples.

DESCRIPTION OF THE INVENTION

One or more objects of the present invention are accomplished by the provision of a two stage polymerization process for the production of high molecular weight polybenzimidazole from a mixture of (1) at least one aromatic tetraamine containing two groups of amine substituents, said amine substituents in each group being in an ortho position relative to each other, and (2) at least one dicarboxylate ester, which comprises heating the mixture above its melting temperature in a first stage melt polymerization zone in the presence of a phosporus-containing polymerization catalyst selected from arylphosphonic acids and arylphosphinic acids, to provide a foamed prepolymer; and heating the prepolymer in a second stage solid state polymerization zone at a temperature above about 250° C. to produce high molecular weight polybenzimidazole product.

In a further embodiment, the present invention provides a two stage polymerization process for the production of high molecular weight polybenzimidazole from at least one monomeric aromatic reactant having a pair of amine substituents in an ortho position relative to each other and a carboxylate ester group positioned on an aromatic nucleus, which comprises heating the reactant above its melting temperature in a first stage melt polymerization zone in the presence of a phosphorus-containing polymerization catalyst selected from arylphosphonic acids and arylphosphinic acids, to provide a foamed prepolymer; and heating the prepolymer in a second stage solid state polymerization zone at a temperature above about 250° C. to produce high molecular weight polybenzimidazole product.

Polybenzimidazoles are a known class of heterocyclic polymers which consist essentially of recurring units of the following Formulas I and II. Formula I is:

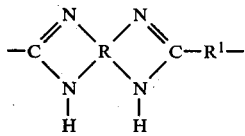

where R is a tetravalent aromatic nucleus with the nitrogen atoms forming the benzimidazole rings being paired upon adjacent carbon atoms, i.e., ortho carbon atoms, of the aromatic nucleus, and $R^1$ is a member of the class consisting of an aromatic ring; an alkylene group (preferably having 4 to 8 carbon atoms); and a heterocyclic ring such as pyridine, pyrazine, furan, quinoline, thiophene, and pyran.

Formula II is:

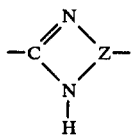

where Z is an aromatic nucleus having the nitrogen atoms forming the benzimidazole ring paired upon ajacent carbon atoms of the aromatic nucleus.

Any of the above polybenzimidazoles represented by the Formulas I and II can be prepared by the process of the present invention.

The following generalized equation illustrates the condensation reaction which occurs in forming the polybenzimidazoles having the recurring units of Formula I:

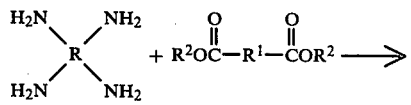

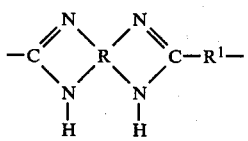

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^2$ in the compound shown is a substituent selected from aliphatic, alicyclic and aromatic groups.

It is advantageous to use as the aromatic tetraamines compounds such as those illustrated below:

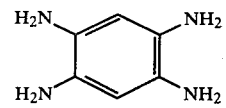

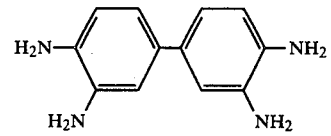

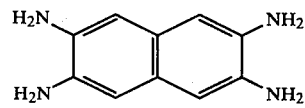

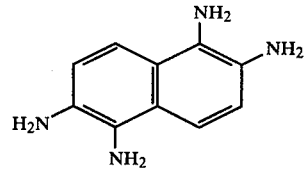

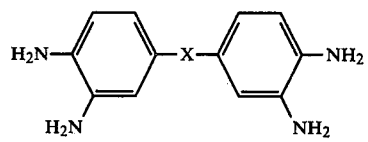

where X represents —O—, —S—, —SO$_2$—,

or a lower alkyl group, such as —CH$_2$—, —(CH$_2$)$_2$—, or —C(CH$_3$)$_2$—. Such aromatic tetraamines include 1,2,4,5-tetraaminobenzene; 1,2,5,6-tetraaminonaphthalene; 2,3,6,7-tetraaminonaphthalene; 3,3',4,4'-tetraaminodiphenyl ether; 3,3',4,4'-tetraaminobiphenyl; 3,3',4,4'-tetraaminodiphenylmethane; 3,3',4,4'-tetraamino-1,2-diphenylethane; 3,3',4,4'-tetraamino-2,2-diphenylpropane; 3,3',4,4'-tetraaminodiphenylthioether; and 3,3',4,4'-tetraaminodiphenylsulfone. The preferred aromatic tetraamine is 3,3',4,4'-tetraaminobiphenyl.

The dicarboxylate esters which are suitable for use in the production of polybenzimidazoles by the process of the present invention include aromatic dicarboxylate esters; aliphatic dicarboxylate esters (preferably, those having 4 to 8 carbon atoms in the carboxylic acid structure); and heterocyclic dicarboxylate esters wherein the ester groups are substituents upon carbon atoms in a ring compound such as pyridine, pyrazine, furan, quinoline, thiophene, and pyran.

The preferred dicarboxylate esters are aromatic dicarboxylate esters such as those illustrated below:

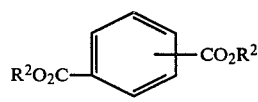

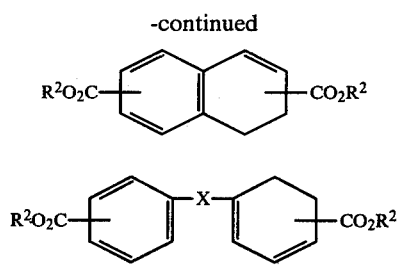

where X and R² are as defined above. Typical dicarboxylate esters include diesters of terephthalic acid; isophthalic acid; 4,4'-biphenyldicarboxylic acid; 1,4-naphthalenedicarboxylic acid; 1,6-naphthalenedicarboxylic acid; 2,6-naphthalenedicarboxylic acid; 4,4'-diphenyletherdicarboxylic acid; 4,4'-diphenylmethanedicarboxylic acid; 4,4'-diphenylsulfonedicarboxylic acid; and 4,4'-diphenylthioetherdicarboxylic acid. Diphenyl isophthalate is the preferred dicarboxylate ester for use in the present invention process.

It is preferred to employ the dicarboxylate ester in a ratio of about 1 mole per mole of aromatic tetraamine. However, in order to obtain a product having an optimum molecular weight, it can be advantageous to employ an excess (e.g., 0.25 mole percent) of either the dicarboxylate ester or the tetraamine monomeric reactant.

Examples of polybenzimidazoles which have the recurring structure of Formula I and which may be prepared according to the process of the present invention include:

poly-2,2'-(m-phenylene)-5,5'-dibenzimidazole);
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5',5"-di(benzimidazole)propane-2,2; and
poly-2,2'-(m-phenylene)-5',5"-di(benzimidazole)ethylene-1,2.

The particularly preferred polybenzimidazole of Formula I prepared by the process of the present invention is poly-2,2'-(m-phenylene)-5,5'-bibenzimidazole as characterized by the recurring unit:

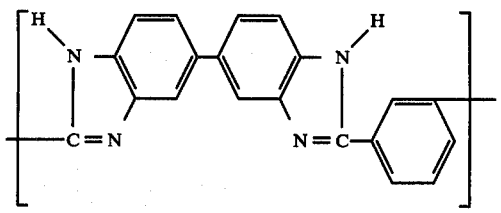

The illustrated polymer can be prepared in accordance with the present invention process by the reaction of 3,3',4,4'-tetraaminobiphenyl with diphenyl isophthalate.

The polybenzimidazoles having the recurring units of Formula II can be prepared by the autocondensation of at least one aromatic compound having a pair of amine substituents in an ortho position relative to each other and a carboxylate ester group positioned upon an aromatic nucleus (referred to hereinafter as the diaminocarboxylate ester reactant). Examples of such compounds are esters of diaminocarboxylic acids which include 3,4-diaminobenzoic acid; 5,6-diaminonaphthalene-1-carboxylic acid; 5,6-diaminonaphthalene-2-carboxylic acid; 6,7-diaminophthalene-1-carboxylic acid; 6,7-diaminonaphthalene-2-carboxylic acid, and the like. A preferred compound is 4-phenoxycarbonyl-3',4'-diaminodiphenyl ether:

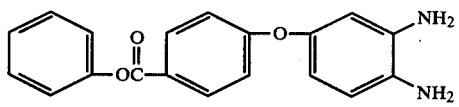

According to the present invention process, high molecular weight polybenzimidazole is produced by reacting the monomeric reactant or reactants described above. The preferred reactants are a mixture of at least one aromatic tetraamine and at least one dicarboxylate ester, as defined above, with 3,3',4,4'-tetraaminobiphenyl and diphenyl isophthalate being especially preferred. In the first stage melt polymerization zone, the monomeric reactant or reactants are polymerized at a temperature above the melting temperature of the monomeric reactant or reactants in the presence of arylphosphonic acid or arylphosphinic acid catalyst to provide a foamed prepolymer.

The first stage melt polymerization reaction usually is conducted at a temperature of at least about 170° C., and preferably at a temperature within the range between about 200°–300° C. In a typical procedure as described in U.S. Pat. No. 3,549,603, the first stage melt polymerization reaction is conducted in a substantially molecular oxygen-free atmosphere for a period of time sufficient to form a prepolymer having an inherent viscosity of at least 0.1 (e.g., 0.13–0.3) dl/g. The average reaction time will vary between about 0.5–3 hours.

Normally a pressure between about 15–50 psi, preferably atmospheric pressure with a flow of nitrogen, is employed in the first stage melt polymerization zone. In a typical run an open polymerization system is utilized which is provided with a distillation column to remove the water and alcohol which are produced as by-products of the condensation-polymerization reaction.

At the conclusion of the first stage melt polymerization reaction, the foamed prepolymer product is cooled and pulverized, and the resultant prepolymer powder is introduced into the second stage solid state polymerization zone.

In this zone, the prepolymer powder is heated at a temperature above about 250° C., preferably in the range between about 320°–420° C. at ambient pressure for a period of time sufficient to yield a high molecular weight polybenzimidazole product.

The second stage reaction is conducted in a substantially oxygen-free atmosphere as with the first stage reaction. For example, an inert gas such as nitrogen or argon can be continuously passed through the reaction zone during the polymerization. The inert gas employed should be substantially oxygen-free, i.e., it should contain less than about 8 ppm of molecular oxygen. The inert gas is introduced into the reaction zone at a rate of flow measured at standard conditions, i.e., atmospheric pressure and temperature, within the range of about 1-200 percent of volume of the reaction zone per minute. The inert gas can be passed into the polymerization reaction zone at room temperature or it can be preheated to the reaction temperature.

The second stage polymerization process is conducted for a period of time sufficient to produce a high molecular weight polybenzimidazole product. The inherent viscosity of the polybenzimidazole product is an indication of its molecular weight. The high molecular weight polybenzimidazoles produced by the invention process exhibit an inherent viscosity of at least approximately 0.6 dl/g when measured at a concentration of 0.4 g of the polymer in 100 ml of 97 percent $H_2SO_4$ at 25° C. Preferably, the polymer exhibits an inherent viscosity of at least approximately 0.7 dl/g. In order to obtain a high molecular weight polybenzimidazole product, the polymerization in the second stage zone is conducted for a reaction period of at least about 0.5 hour, e.g., a reaction period between about 1-4 hours.

In the invention two stage polymerization system, the polymerization catalyst is employed in a quantity between about 0.01-5 weight percent, based on the total weight of monomeric material being reacted. In a typical starting mixture the weight of polymerization catalyst employed is in the range between about 0.1-1.0 percent, based on the total weight of monomeric material introduced into the first stage melt polymerization zone.

An important aspect of the present invention is the use of a specific class of phosphorus-containing polymerization catalysts. Illustrative of preferred catalysts are arylphosphonic acid and arylphosphinic acids corresponding to the formulae:

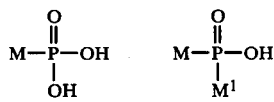

where M is an aryl substituent, and $M^1$ is a substituent selected from hydrogen, alkyl and aryl groups. Suitable catalysts include phenylphosphonic acid, tolylphosphonic acid, naphthylphosphonic acid, phenylphosphinic acid, naphthylphosphinic acid, butyl-phenylphosphinic acid, diphenylphosphinic acid, and the like. M and $M^1$ as defined above can contain non-interfering heteroatoms such as oxygen, sulfur, nitrogen and halogen.

A present invention phosphorus-containing polymerization catalyst is superior to prior art catalysts, such as phosphoric acid or triphenyl phosphate as previously described above, in that there is little or no formation of gel and/or insoluble black specks, the presence of which are detrimental to the Plugging Value property.

An important advantage derived from the practice of the present invention two stage polymerization process is the provision of a high molecular weight polybenzimidazole which has a novel combination of desirable properties. Thus, under optimal operating conditions the present invention process provides polybenzimidazole which is characterized by properties comprising an Inherent Viscosity of at least about 0.7 dl/g when measured at a concentration of 0.4 g of said polybenzimidazole in 100 ml of 97 percent sulfuric acid at 25° C.; a Weight Average Molecular Weight of at least about 100,000; a Plugging Value of greater than about 0.5; a Gardner Color of less than about 10; and which polybenzimidazole is capable of forming a 15 weight percent solution when heated at 240° C. for two hours in dimethylacetamide solvent containing 2 weight percent of lithium chloride.

Polybenzimidazole (PBI) molecular weight constants referred to herein are determined by employing a Waters 201 instrument with two porous silica columns (Waters μ-Bondagel E-linears) at the concentration of 0.2 g wt/vol in DMAc containing 2% LiCl. The calculations are based on a calibration curve obtained with eleven polystyrene molecular weight standards with the range between 2100 and 1,800,000, and the PBI molecular weight corresponds to the polystyrene equivalent molecular weight.

Number Average Molecular Weight ($\overline{M}m$) and Weight Average Molecular Weight ($\overline{M}w$) and Molecular Weight Distribution are related as follows:

$$MWD = \overline{M}w/\overline{M}n$$

The double logarithm of Intrinsic Viscosity (97% $H_2SO_4$) versus Weight Average Molecular Weight (DMAc, 2% LiCl) can be plotted, and the Mark-Houwink equation for PBI molecular weight can be derived from the plot and expressed as $$[\eta]_{H_2SO_4} = 1.35326 \times 10^{-4} M^{0.73287}$$

The relationship of Intrinsic Viscosity to Inherent Viscosity of PBI in 97% sulfuric acid can be expressed as:

$$[\eta] = 1.0585 \cdot \eta_{inh}$$

By using these expressions, the molecular weight of PBI polymers can be estimated from intrinsic or inherent viscosities in a reasonable agreement with the experimental values.

Plugging Value (P.V.) referred to herein is a measure of solution filterability, and is determined from the filtration rate through a fine filter paper. The PBI polymer to be evaluated is dissolved in 97.0±0.1% sulfuric acid at a known concentration of 5 to 7%. The solution is prepared by weighing the desired quantity of sulfuric acid (e.g., 95 grams) into a 250 ml glass-stoppered Erlenmeyer flask, and then weighing the desired quantity of polymer (e.g., 5 grams) with the flask. The polymer is dissolved by shaking on a wrist-action shaker for a minimum of two to three days depending upon the Intrinsic Viscosity (I.V.) level (i.e., longer for higher I.V.'s). The filtration apparatus consists of a 2" stainless steel pressure filter (Gelman Instrument Co.), Model 4240, and Gelman Type A, 2" glass filter papers. The solution after shaking is poured into the filter chamber and one atmosphere of pressure from a nitrogen cylinder is applied. Zero time is taken as the first drop reaches the receiver located on a balance below the filtration unit. The weight of the solution that passes through the filter is recorded with respect to time. Data is continuously generated until either the filter is emptied or the filtration rate is very slow as a result of plugging.

Calculation of the Plugging Value is as follows:
1. Each time in minutes is divided by the corresponding weight in grams of solution (total) through the filter at that time.

2. The obtained values are plotted against time. The resulting graph approximates a straight line. The initial curvature is disregarded as well as the last few points if curvature would again exist.
3. The reciprocal slope of the graph represents the theoretical weight in grams of solution that would pass through the filter in infinite time in order to plug it. This is designated as $W\infty$.

$$P.V. = \frac{W\infty \times \text{Concentration}}{\text{Filter Area}}$$

Polybenzimidazole Gardner Color referred to herein is a value which is determined relative to the Gardner Color scale (Gardner Laboratory Inc., Bethesda, Md.).

The Gardner Color scale consists of a gradation of twenty color shades ranging from water-white(1) to dark brown(20). In accordance with the present invention, polybenzimidazole is provided which has a Gardner Color of less than about 10. A typical commercial type polybenzimidazole fiber has a Gardner Color of about 14.

The following Examples are further illustrative of the present invention. The reactants and other specific ingredients and conditions are presented as being typical, and various modifications can be devised in view of the foregoing disclosure within the scope of the invention.

EXAMPLE I

Into a three-necked flask equipped with a nitrogen inlet and outlet, mechanical stirrer and a condenser are placed 23.333 g (0.1089 mole) of 3,3',4,4'-tetraaminobiphenyl, 34.67 g (0.1089 mole) of diphenylisophthalate and 0.3 g of diphenylphosphinic acid. The flask is degassed and then filled with nitrogen. The degassing is repeated at least three times. The mixture is heated rapidly with stirring to 225° C. The stirring is stopped. The temperature of the reaction mixture is then raised to 270° C. and held at that temperature for 1.5 hours. The resulting product is cooled to room temperature and then is ground.

The ground prepolymer is placed in a flask and after the degassing step is repeated the prepolymer is heated at 360° C. for one hour. The resulting polybenzimidazole exhibits a weight average molecular weight of 201,700 with a molecular weight distribution of 2.91 and an inherent viscosity of 1.00 dl/g when measured in a concentration of 0.4 g of the polybenzimidazole in 100 ml of 97% sulfuric acid.

Similar results are obtained when the catalyst is phenylphosphonic acid or diphenylphosphinic acid.

A polybenzimidazole polymer as prepared above is further characterized by a Plugging Value of greater than about 0.5, and a Gardner color of less than about 10.

EXAMPLE II

The polybenzimidazole of Example I is prepared according to the procedure described in Example I, but without the inclusion of a catalyst. The inherent viscosity of the polybenzimidazole thus produced is 0.68 dl/g when measured in a concentration of 0.4 g of the polybenzimidazole in 100 ml of 97% sulfuric acid at 25° C. This polymer has a weight average molecular weight of 113,000 and molecular weight distribution of 2.56.

The Plugging Value and Gardner Color of this polybenzimidazole are inferior to those obtained by the Example I invention process.

What is claimed is:

1. A two stage polymerization process for the production of high molecular weight polybenzimidazole from at least one monomeric aromatic reactant having a pair of amine substituents in an ortho position relative to each other and a carboxylate ester group positioned on an aromatic nucleus, which comprises heating the reactant above the reactant melting temperature in a first stage melt polymerization zone in contact with a phosphorus-containing polymerization catalyst selected from arylphosphonic acids or arylphosphinic acids, to provide a foamed prepolymer; and heating the prepolymer in a second stage solid state polymerization zone at a temperature above about 250° C. to produce high molecular weight polybenzimidazole product.

2. A process in accordance with claim 1 wherein the monomeric aromatic reactant is 4-phenoxycarbonyl-3',4'-diaminodiphenyl ether.

* * * * *